United States Patent
Duong et al.

(10) Patent No.: US 8,612,478 B1
(45) Date of Patent: Dec. 17, 2013

(54) LOCATION BASED QUERY-RESPONSE MANAGEMENT SYSTEM

(76) Inventors: Thuy Ngoc Duong, San Diego, CA (US); Yuko Takeuchi Doron, San Diego, CA (US)

( * ) Notice: Subject to any disclaimer, the term of this patent is extended or adjusted under 35 U.S.C. 154(b) by 0 days.

(21) Appl. No.: 13/526,917

(22) Filed: Jun. 19, 2012

(51) Int. Cl.
*G06F 17/30* (2006.01)

(52) U.S. Cl.
USPC .............. 707/770; 707/740; 434/322

(58) Field of Classification Search
USPC ................... 707/770, 740; 434/322
See application file for complete search history.

(56) References Cited

U.S. PATENT DOCUMENTS

| | | | | |
|---|---|---|---|---|
| 8,230,087 | B2 * | 7/2012 | Alve | 709/229 |
| 2002/0038233 | A1 * | 3/2002 | Shubov et al. | 705/8 |
| 2008/0022003 | A1 * | 1/2008 | Alve | 709/229 |
| 2009/0248663 | A1 * | 10/2009 | Maniyar et al. | 707/5 |
| 2010/0036834 | A1 * | 2/2010 | Bandas | 707/5 |
| 2012/0171654 | A1 * | 7/2012 | D'Angelo et al. | 434/322 |
| 2012/0185484 | A1 * | 7/2012 | Jones et al. | 707/740 |
| 2013/0018909 | A1 * | 1/2013 | Dicker et al. | 707/758 |

* cited by examiner

*Primary Examiner* — Debbie Le
(74) *Attorney, Agent, or Firm* — Ash Tankha; Lipton, Weinberger & Husick

(57) ABSTRACT

A computer implemented method and system for rendering time sensitive responses to a query associated with a target location is provided. A query-response management server receives a query containing information on a target location from a first client application on a requesting user's requesting device via a network. The query-response management server dynamically retrieves location information and activity information of each of multiple responding users via the network and identifies one or more of the responding users proximal to the target location based on the location information and the activity information. The query-response management server transmits the query to a second client application on a responding device of each of the identified responding users via the network. The query-response management server receives and aggregates responses to the query from the second client application via the network and renders the aggregated responses to the first client application on the requesting device.

24 Claims, 10 Drawing Sheets

LOCATION BASED QUERY-RESPONSE MANAGEMENT SYSTEM

BACKGROUND

With the widespread use of internet services, an increasing number of persons use question and answer services to find knowledge and information on subjects in which they are interested. Currently, users with questions log onto a website and present the questions on the website. The questions are displayed on the website and are answered by other users who are also logged onto the website. One or more users may provide answers to the questions. The website displays the answers to the questions and notifies the users who presented the questions to view the answers to the questions on the website. The current question and answer services are unable to manage questions that require time sensitive answers in a timely manner, which results in the questions remaining pending or unanswered until another user possessing knowledge on the subjects of the questions logs onto the website, views the pending questions, and answers them. By the time the answers are presented to the users who asked the questions, the answers may have lost their purpose or relevance or may have become outdated. Furthermore, questions are typically presented to a general user base without regard to context, for example, a location associated with each of the questions.

Conventional question and answer services lack a real time context aware management of questions or queries, due to which users fail to receive timely responses to their queries from other users who have sufficient knowledge on the context of the queries. Consider an example where a user wishes to receive a quick response to a question associated with a particular location. A conventional question and answer service may receive the question and display the received question on an interactive interface to a general user base. The user may fail to receive an accurate response in a timely manner if other users do not access the interactive interface in time or do not have the knowledge or interest to respond to the question viewed on the interactive interface. The time for receiving a response to the question depends on the time that the question is accessed on the interactive interface by another user. Some users may currently be in close proximity to a particular location referenced in a question and therefore are in a better position to answer the question. In order to receive accurate and relevant responses to a question associated with a particular location, there is a need to identify users who are proximal to a particular location referenced in the question instead of waiting for appropriate users to find the question posted on the interactive interface.

Hence, there is a long felt but unresolved need for a computer implemented method and system that manages a query associated with a target location and responses to the query. Moreover, there is a need for a computer implemented method and system that renders time sensitive responses to a query associated with a target location, to a requesting user who asked the target location based query. Furthermore, there is a need for a computer implemented method and system that identifies one or more users who are proximal to the target location referenced in the query and routes the query associated with the target location to the identified users.

SUMMARY OF THE INVENTION

This summary is provided to introduce a selection of concepts in a simplified form that are further disclosed in the detailed description of the invention. This summary is not intended to identify key or essential inventive concepts of the claimed subject matter, nor is it intended for determining the scope of the claimed subject matter.

The computer implemented method and system disclosed herein address the above mentioned need for managing a query associated with a target location and responses to the query. As used herein, the term "target location" refers to a geographical location about which a requesting user has a query, or a location proximal to which a responding user is located. Moreover, the computer implemented method and system disclosed herein renders time sensitive responses to a query associated with a target location, to a requesting user who asked the target location based query. A time sensitive response is a timely response provided to the requesting user to allow the requesting user to use the information provided in the response. The computer implemented method and system disclosed herein provide time sensitive responses to the requesting user so that the responses are purposeful or relevant to the requesting user without being outdated and unusable by the requesting user. Furthermore, the computer implemented method and system disclosed herein identifies one or more users who are proximal to the target location referenced in the query and routes the query associated with the target location to the identified users. The computer implemented method and system disclosed herein therefore provides a time sensitive and location-aware question and answer service that bridges a communication gap between users with location based queries and users who possess the knowledge to respond to the location based queries due to their proximity to the locations referenced in the queries. The responding users' proximity to the locations referenced in the queries provides the requesting user with relevant and time sensitive information that can be used by the requesting user in a timely manner.

The computer implemented method and system disclosed herein provides a first client application executable by at least one processor on a requesting device of a requesting user. As used herein, the term "requesting user" refers to a user requesting a response to a query associated with a target location. Also, as used herein, the term "requesting device" refers to a portable or a non-portable computing device, for example, a mobile phone, a smart phone, a tablet computing device, a personal digital assistant, a personal computer, a server, a laptop, a network enabled device, etc., that deploys the first client application used by the requesting user to transmit a query. The computer implemented method and system disclosed herein also provides a second client application executable by at least one processor on a responding device of each of multiple responding users. As used herein, the term "responding user" refers to a user proximal to a target location referenced in a query and who can potentially provide a response to the query. Also, as used herein, the term "responding device" refers to a generally portable location enabled computing device, for example, a mobile phone, a smart phone, a tablet computing device, a personal digital assistant, a laptop, a network enabled device, etc., that deploys the second client application used by a responding user for transmitting a response to a query. The location enabled computing device provides global location information on a geographical position of the computing device and allows tracking of the computing device. In an embodiment, the responding device is an internet enabled computing device having an internet protocol (IP) address that is used for determining the location of the internet enabled computing device.

The computer implemented method and system disclosed herein also provides a query-response management server comprising at least one processor configured to render time sensitive responses to a query associated with a target location. The query-response management server communicates with the first client application on the requesting device and the second client application on the responding device via a network. The first client application on the requesting device of the requesting user transmits a query comprising information on a target location in a predefined media format to the query-response management server via the network. The query-response management server receives the query comprising information on the target location from the first client application on the requesting device of the requesting user via the network.

The query-response management server dynamically retrieves location information and activity information of each of the responding users via the network. The query-response management server identifies one or more of the responding users proximal to the target location extracted from the received query based on the dynamically retrieved location information and activity information. In an embodiment, the query-response management server maps the target location extracted from the received query to geographical coordinates of the target location for identifying one or more of the responding users proximal to the target location. The query-response management server dynamically monitors a location of the responding device of each of the responding users via the network, for identifying the responding users proximal to the target location.

In an embodiment, the query-response management server selects one or more of the identified responding users for routing the received query based on the dynamically retrieved activity information of each of the identified responding users. The query-response management server transmits the received query to the second client application on the responding device of each of the identified responding users via the network. The second client application on the responding device of each of the selected responding users prompts each of the selected responding users via a graphical user interface (GUI) of the second client application, on reception of the transmitted query by the responding device of each of the selected responding users. In an embodiment, the query-response management server awaits reception of the responses to the transmitted query from the second client application on the responding device of each of the selected responding users via the network for a predefined period of time. On non-reception of the responses from the selected responding users within the predefined period of time, the query-response management server selects another one or more of the identified responding users for routing the received query based on the dynamically retrieved activity information of each of the other selected responding users. The second client application on the responding device of each of one or more of the selected responding users transmits the responses to the transmitted query to the query-response management server via the network in one or more of multiple media formats, for example, a text media format, an image media format, a video media format, an audio media format, a voice media format, a non-voice audio media format, a digital media format, a multimedia format, etc.

The query-response management server receives and aggregates responses to the transmitted query from the second client application on the responding device of each of the selected responding users via the network. The query-response management server renders the aggregated responses to the first client application on the requesting device of the requesting user via the network. The first client application on the requesting device of the requesting user prompts the requesting user via a graphical user interface of the first client application, on reception of the aggregated responses by the requesting device of the requesting user from the query-response management server via the network.

BRIEF DESCRIPTION OF THE DRAWINGS

The foregoing summary, as well as the following detailed description of the invention, is better understood when read in conjunction with the appended drawings. For the purpose of illustrating the invention, exemplary constructions of the invention are shown in the drawings. However, the invention is not limited to the specific methods and components disclosed herein.

DETAILED DESCRIPTION OF THE INVENTION

Figure 1:
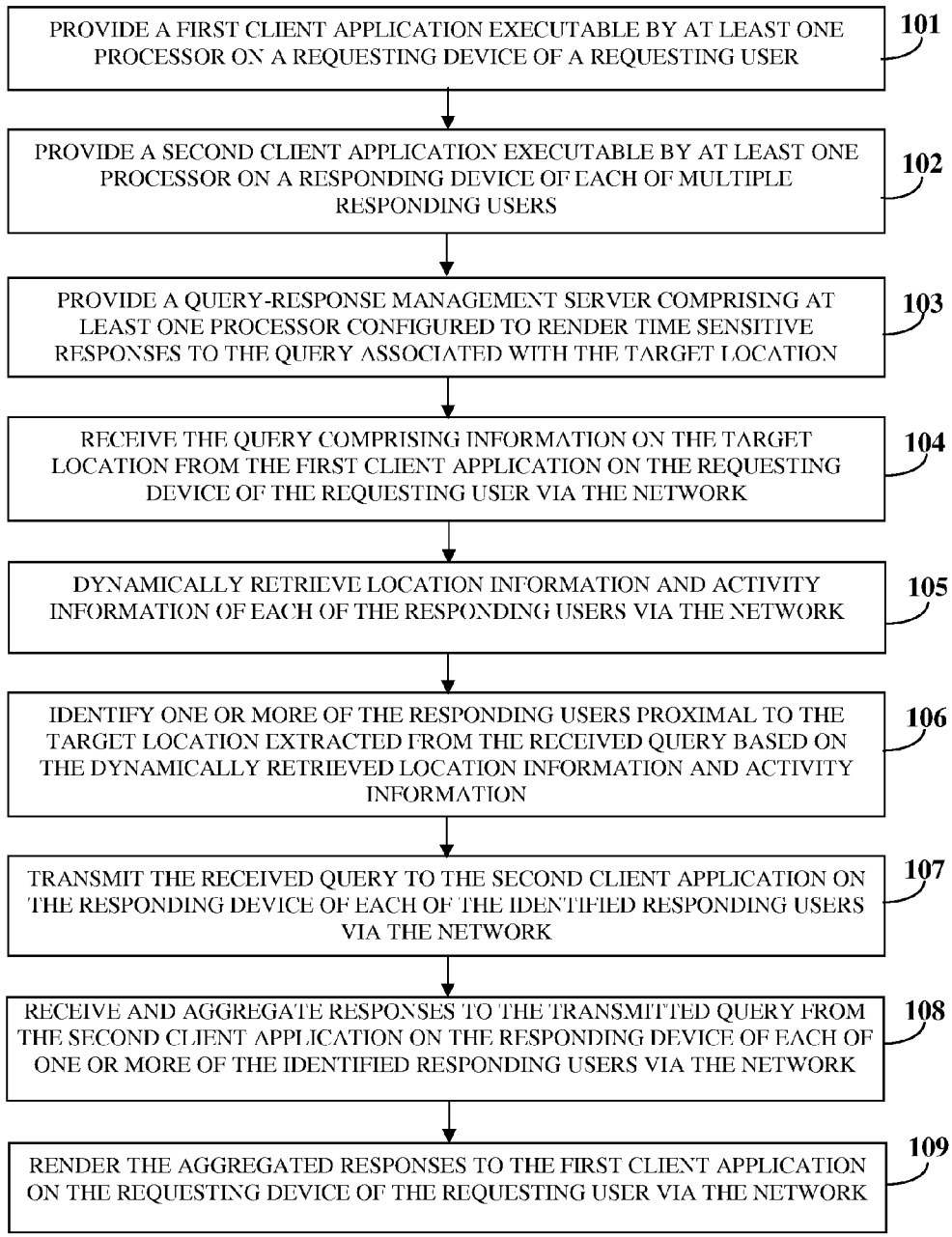
FIG. 1 illustrates a computer implemented method for rendering time sensitive responses to a query associated with a target location.

FIG. 1 illustrates a computer implemented method for rendering time sensitive responses to a query associated with a target location. A time sensitive response is a timely response provided to a requesting user to allow the requesting user to use the information provided in the response. The computer implemented method disclosed herein provides time sensitive responses to the requesting user so that the responses are purposeful or relevant to the requesting user without being outdated and unusable by the requesting user. Also, as used herein, the term "target location" refers to a geographical location about which a requesting user has a query, or a location proximal to which a responding user is located. Also, as used herein, the term "requesting user"

refers to a user requesting a response to a query associated with a target location. Also, as used herein, the term "responding user" refers to a user proximal to a target location referenced in a query and who can potentially provide a response to the query. The computer implemented method disclosed herein provides 101 a first client application executable by at least one processor on a requesting device of a requesting user. The first client application also referred to as an "answer seeking application" is, for example, a web application or a mobile application that allows the requesting user to input location based queries, transmits the location based queries to a query-response management server via a network, receives responses pushed by the query-response management server, and displays the responses to the location based queries on a graphical user interface (GUI). The location based queries are queries associated with target locations, for example, "How long is the current security line at the airport?", "What are the actual snow conditions at the ski resort today?", etc., where the target locations are the airport, the ski resort, etc., respectively. As used herein, the term "requesting device" refers to a portable or a non-portable computing device, for example, a mobile phone, a smart phone, a tablet computing device, a personal digital assistant, a personal computer, a server, a laptop, a network enabled device, etc., that deploys the first client application used by the requesting user to transmit a query. In an embodiment, the requesting device is a location enabled computing device.

The computer implemented method disclosed herein also provides 102 a second client application executable by at least one processor on a responding device of each of multiple responding users. The second client application also referred to as a "question answering application" is, for example, a web application or a mobile application that alerts the responding user to respond to the location based queries, guides the responding user through a data collection process to respond to the location based queries, and transmits the responses to the query-response management server. As used herein, the term "responding device" refers to a generally portable location enabled computing device, for example, a mobile phone, a smart phone, a tablet computing device, a personal digital assistant, a laptop, a network enabled device, etc., that deploys the second client application used by a responding user for transmitting a response to a query. The location enabled computing device provides global location information on a geographical position of the computing device and allows tracking of the computing device. The responding user may carry the responding device to different locations. In an embodiment, the responding device is an internet enabled computing device having an internet protocol (IP) address that is used for determining the location of the internet enabled computing device.

The computer implemented method disclosed herein provides 103 a query-response management server comprising at least one processor configured to render time sensitive responses to a query associated with a target location. Although the detailed description refers to a single query-response management server, the scope of the computer implemented method and system disclosed herein is not limited to a single query-response management server but may be extended to include one or more servers comprising one or more processors configured to render time sensitive responses to a query associated with a target location. The query-response management server is, for example, an online server accessible by the requesting user and the responding user via a network. The network is, for example, the internet, an intranet, an extranet, a local area network, a wide area network, a communication network that implements Wi-Fi® of the Wireless Ethernet Compatibility Alliance, Inc., a wired network, a wireless network, a cellular network, a mobile communication network, etc., and any combination thereof. The mobile communication network is, for example, a global system for mobile communications (GSM) network, a general packet radio service (GPRS) network, etc. In an embodiment, the query-response management server hosts a website accessible by the requesting user and the responding users via the network. In this embodiment, the query-response management server determines location information of the responding users, for example, by determining an internet protocol address of the responding device of each of the responding users. The query-response management server communicates with the first client application on the requesting device and the second client application on the responding device via the network.

A requesting user who wishes to obtain time sensitive responses to a query associated with a target location, also referred to as a "location based query" or a "target location based query", enters the location based query in a predefined media format into the first client application on the requesting device via a graphical user interface (GUI) of the first client application. For example, the requesting user enters the location based query in a text format, for example, "I want to know <WHAT> <WHERE> and the answer is relevant until <WHEN>" via the GUI of the first client application. In another example, the requesting user may record the location based query in a voice media format into the first client application. The first client application on the requesting device transmits the location based query in the predefined media format to the query-response management server via the network. The query-response management server receives 104 the query comprising information on the target location in the predefined media format from the first client application on the requesting device of the requesting user via the network. The query-response management server extracts the target location from the query for further processing. In an embodiment, the query-response management server maps the target location extracted from the received query to geographical coordinates of the target location for identifying one or more responding users proximal to the target location.

The query-response management server dynamically retrieves 105 location information and activity information of each of the responding users via the network. As used herein, the term "location information" refers, for example, to geographical position coordinates, an internet protocol address, etc., of a location of a requesting device of a responding user. In an example, the location enabled responding devices of the responding users registered with the query-response management server continuously transmit their respective geographical position coordinates to the query-response management server via the network. The query-response management server determines the location of each of the responding devices using the transmitted geographical position coordinates. In another example, the query-response management server retrieves internet protocol (IP) addresses of the responding devices via the network and determines the location of each of the responding devices using the retrieved IP addresses of the respective responding devices. The query-response management server accesses an internet protocol lookup system via the network to determine, for example, geographical location information such as country, region or state, city, latitude, longitude, telephone area code, etc., and a location specific map for a particular IP address of a responding device. In an embodiment, the query-response management server dynamically monitors the location of the responding device of each of the responding users via the network for identifying the responding users proximal to the target location.

Also, as used herein, the term "activity information" comprises, for example, a history of previous activities performed by the responding user in communication with the query-response management server, a history of alerts, a history of responses, etc. The history of alerts records when alerts of queries were transmitted to the responding users. The query-response management server utilizes the history of alerts to select responding users for responding to queries without overburdening the responding users. For example, if there were multiple alerts with queries previously transmitted to a particular responding user, the query-response management server selects other responding users for routing a newly received query, thereby avoiding overburdening the particular responding user with multiple queries which may cause them to lose interest in responding to queries. The history of responses records when each responding user responds, to which queries each responding user responds, quality of the responses as rated by the requesting user, etc. The query-response management server utilizes the history of responses to enhance the probability that queries transmitted to the responding users will be answered and will be answered relevantly and accurately.

The query-response management server identifies 106 one or more of the responding users proximal to the target location extracted from the received query based on the dynamically retrieved location information and activity information. That is, the query-response management server determines a configurable number of responding users, based on the current location of the responding users, the target location extracted from the received query, and the activity history of the responding users. In an embodiment, the query-response management server selects one or more of the identified responding users for routing the received query based on the dynamically retrieved activity information of each of the identified responding users. The query-response management server transmits 107 the received query to the second client application on the responding device of each of the selected responding users via the network.

In an embodiment, the query-response management server awaits reception of responses to the transmitted query from the second client application on the responding device of each of the selected responding users via the network for a predefined period of time. In an embodiment, the query-response management server selects another one or more of the identified responding users for routing the received query based on the dynamically retrieved activity information of each of the other selected responding users, on non-reception of the responses from the selected responding users within the predefined period of time. The query-response management server selects a configurable number of responding users, for example, based on their activity history and history of alerts. On reception of the transmitted query by the responding device of each of the selected responding users, the second client application on the responding device of each of the selected responding users prompts each of the selected responding users via a graphical user interface (GUI) of the second client application. The second client application on the responding device of each of the selected responding users transmits the responses to the transmitted query, input by the selected responding users, to the query-response management server via the network in one or more of multiple media formats, for example, a text media format, an image media format, a video media format, an audio media format, a voice media format, a non-voice audio media format, a digital media format, a multimedia format, etc.

The query-response management server receives and aggregates 108 the responses to the transmitted query from the second client application on the responding device of each of one or more of the selected responding users via the network. The query-response management server renders 109 the aggregated responses to the first client application on the requesting device of the requesting user via the network. The first client application on the requesting device of the requesting user prompts the requesting user via a graphical user interface (GUI) of the first client application, on reception of the aggregated responses by the requesting device of the requesting user from the query-response management server via the network.

In an embodiment, the query-response management server transmits a feedback request to the first client application on the requesting device of the requesting user via the network, to provide feedback or a rating for each of the rendered responses to the location based query asked by the requesting user. The query-response management server stores the feedback or ratings received from the requesting user in a database management system. The query-response management server utilizes the feedback to provide a rating to each of the responding users. The query-response management server utilizes the rating of each of the responding users as one of the selection criteria for subsequently selecting responding users for routing of the queries.

Figure 2:
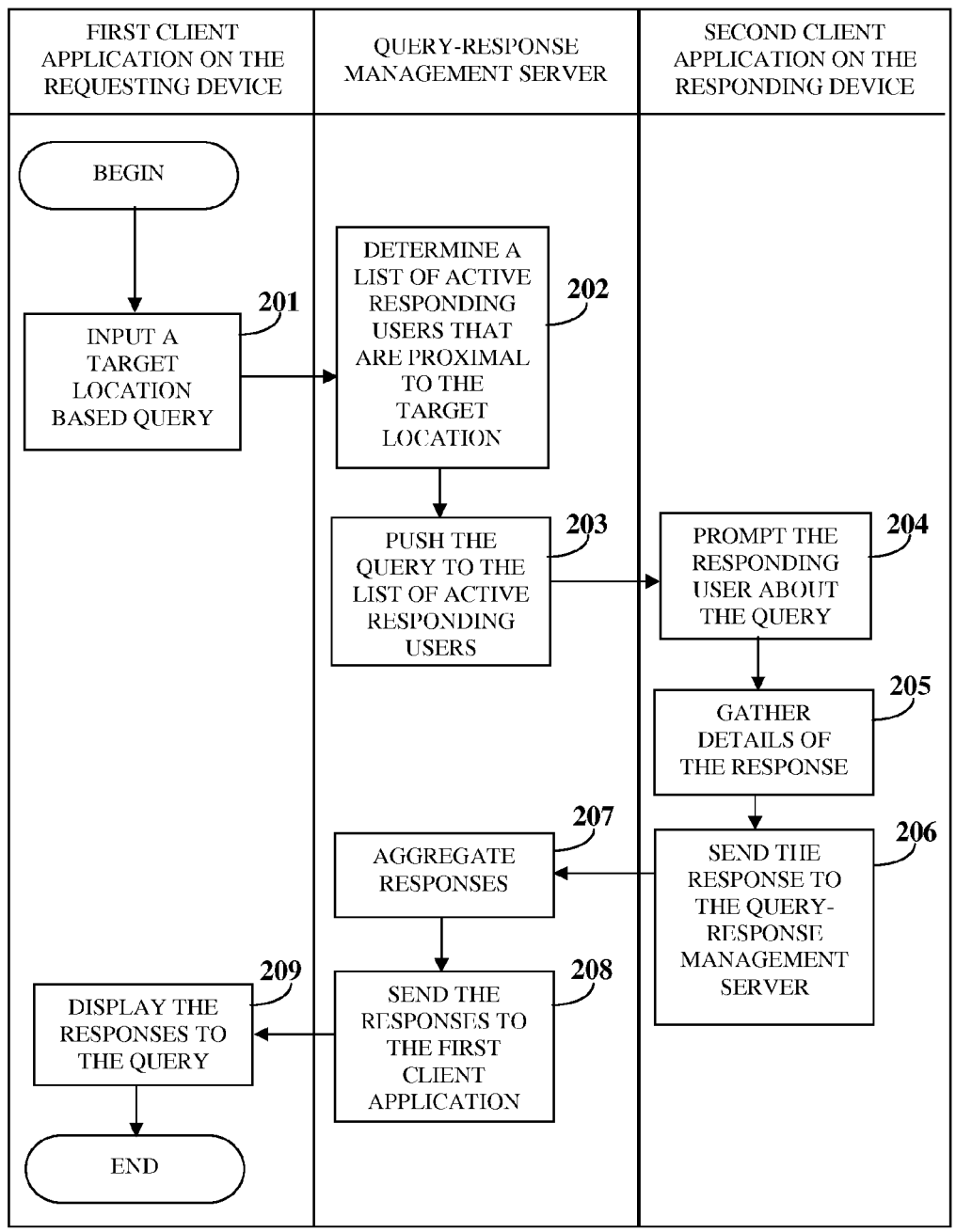
FIG. 2 exemplarily illustrates a process flow diagram comprising the steps for rendering time sensitive responses to a query associated with a target location.

FIG. 2 exemplarily illustrates a process flow diagram comprising the steps for rendering time sensitive responses to a query associated with a target location. A requesting user inputs 201 a target location based query into the first client application on the requesting device via the graphical user interface (GUI) of the first client application. The first client application transmits the target location based query to the query-response management server. The query-response management server extracts the target location from the query and determines 202 a list of active responding users that are proximal to the target location. The query-response management server performs a push operation to push 203 the query to the list of active responding users via the network. The push operation is a network based transmission initiated by the query-response management server. The second client application on the responding device of each of the responding users on the list prompts 204 each of the responding users about the query. In an embodiment, the second client application prompts or alerts each responding user, for example, using early media such as ringtones, vibrate modes, etc., about the query. If the responding user wants to respond to the query, the second client application gathers 205 details for the response via the graphical user interface (GUI) of the second client application and sends 206 the response to the query-response management server via the network. The query-response management server aggregates 207 the responses from the responding users and sends 208 the responses to the first client application on the requesting device of the requesting user via the network. The first client application then displays 209 the responses to the query on the GUI of the first client application.

Figure 3:
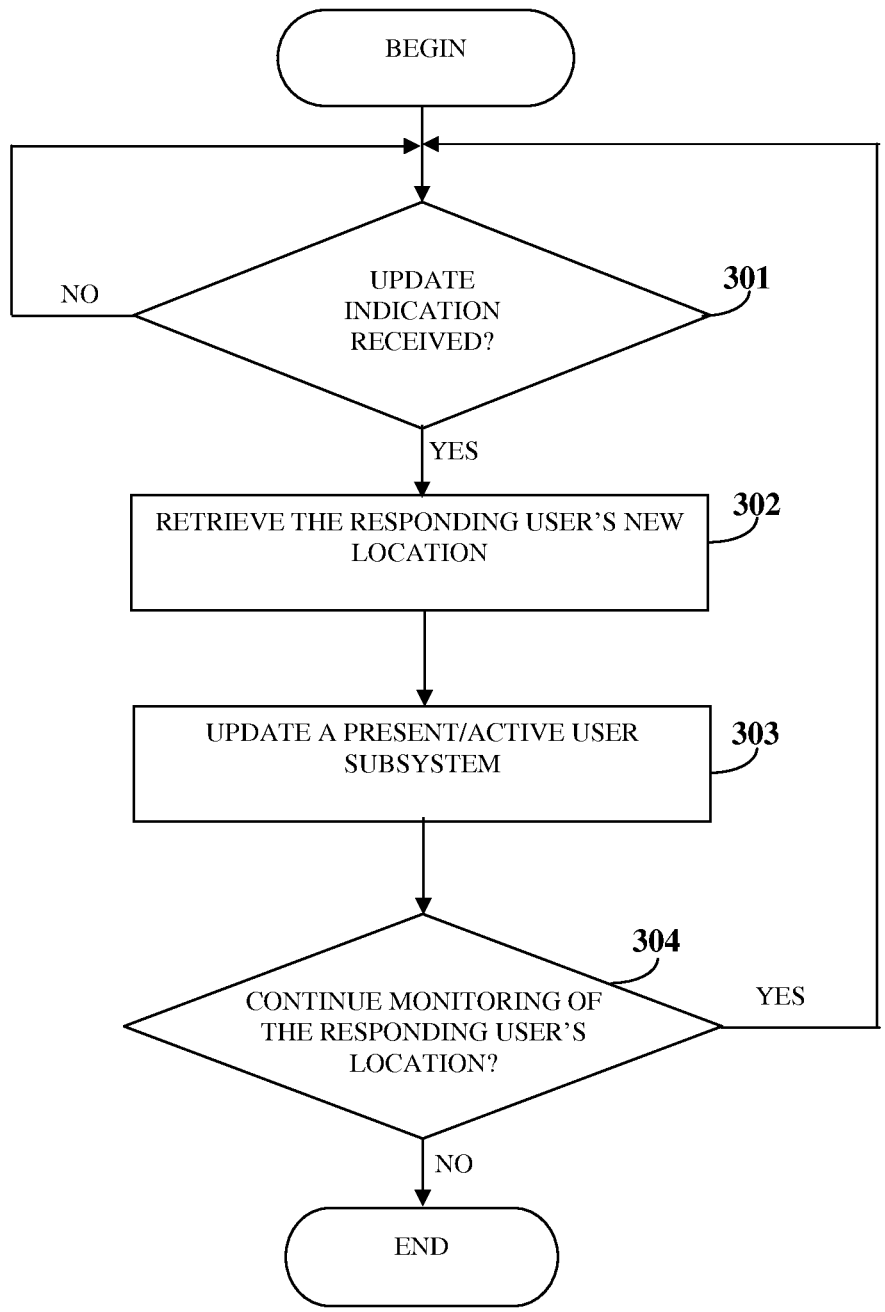
FIG. 3 exemplarily illustrates a flowchart comprising the steps performed by a query-response management server for dynamically retrieving location information of each of multiple responding users.

FIG. 3 exemplarily illustrates a flowchart comprising the steps performed by the query-response management server for dynamically retrieving location information of each of multiple responding users. The query-response management server dynamically monitors a location of the responding device of each of the responding users via the network for identifying the responding users proximal to a target location extracted from a location based query received from a requesting user. The query-response management server determines whether an update indication is received 301 from the second client application on the requesting device of a particular responding user, that indicates whether the responding user's movement is geographically significant. That is, the query-response management server determines whether a change in location of the responding user or proximity of the responding user is large or small with reference to the target location. If the query-response management server has not received an update indication from the second client application, the query-response management server continues to check whether an update indication is received 301. If the query-response management server receives an update indication, the query-response management server retrieves 302 the responding user's new location and updates 303 the new location, for example, in a present/active user subsystem of a database management system that communicates with the query-response management server. After the query-response management server updates the new location, the query-response management server determines whether to continue monitoring 304 the responding user's location. If the query-response management server determines that monitoring should continue, the query-response management server continues to check whether an update indication is received 301. If the query-response management server determines that monitoring should not continue, the query-response management server then ends the process for that particular responding user.

Figure 4A:
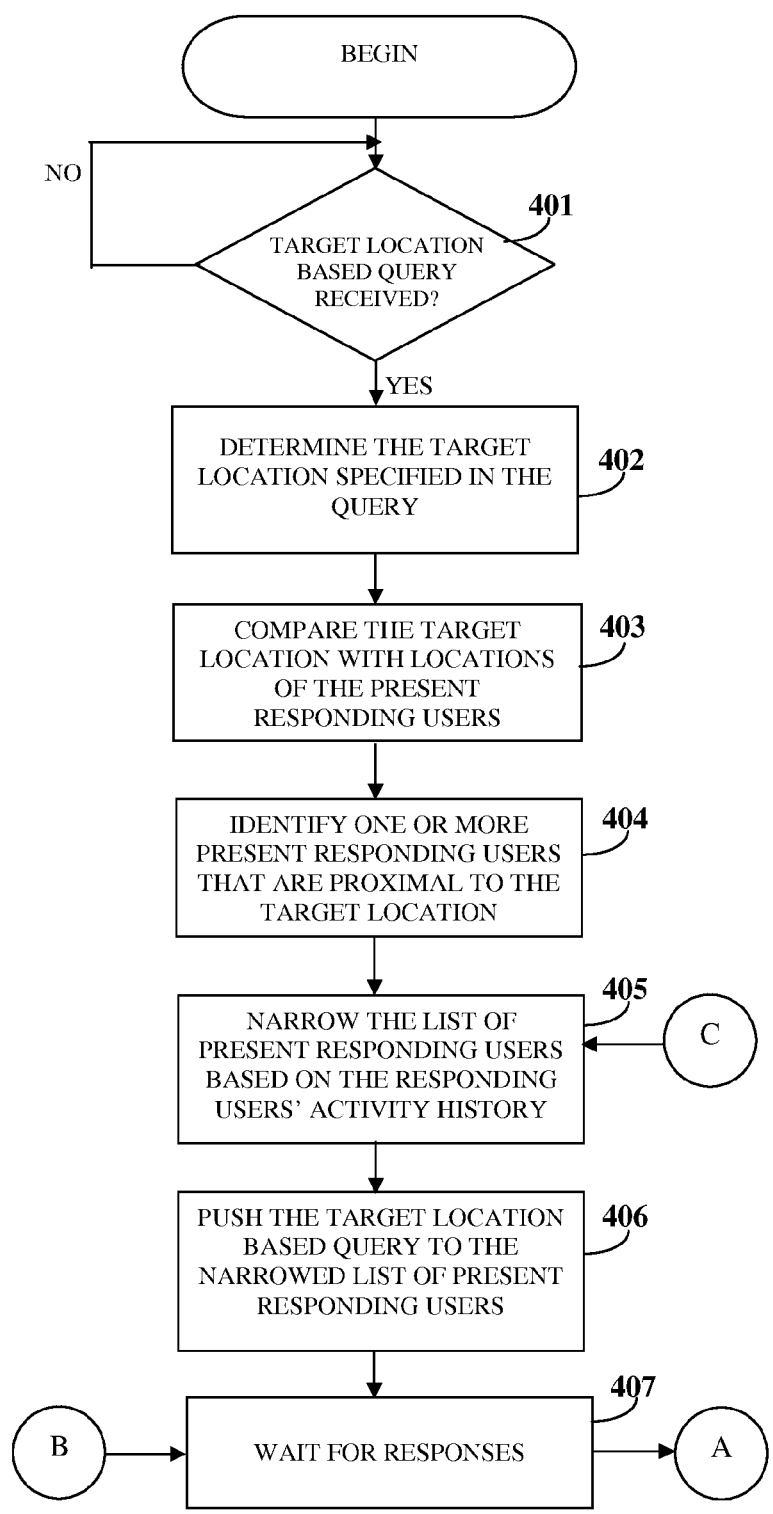
FIGS. 4A-4B exemplarily illustrate a flowchart comprising the steps performed by the query-response management server for identifying one or more responding users who are proximal to a target location extracted from a query and who potentially possess knowledge to respond to the query, for routing the query to the identified responding users, and for transmitting aggregated responses to a requesting user.
Figure 4B:
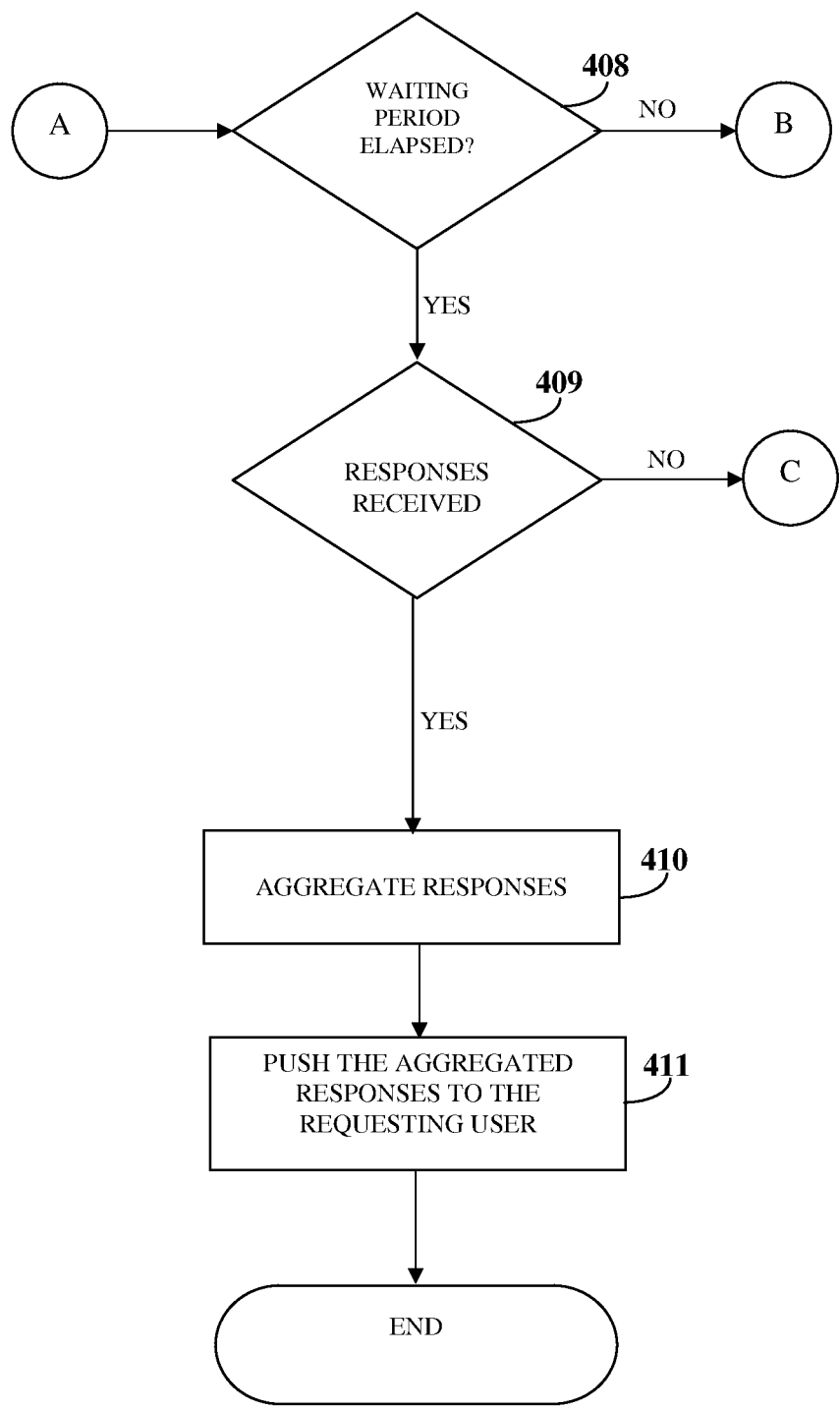

FIGS. 4A-4B exemplarily illustrate a flowchart comprising the steps performed by the query-response management server for identifying one or more responding users who are proximal to a target location extracted from a query and who potentially possess knowledge to respond to the query, for routing the query to the identified responding users, and for transmitting aggregated responses to a requesting user. The query-response management server determines whether a target location based query is received 401 from the first client application on a requesting device of a requesting user. If the query-response management server has not received the target location based query, the query-response management server continues to check whether the target location based query is received 401. If the query-response management server receives a target location based query, the query-response management server determines 402 the target location specified in the query. The query-response management server compares 403 the target location with locations of the present responding users stored in the present/active user subsystem of the database management system to identify 404 one or more present responding users that are proximal to the target location.

The query-response management server narrows 405 the list of present responding users, for example, based on the responding users' activity history stored in a user activity history subsystem to increase a probability that the target location based query is responded by the responding users. The user activity history comprises, for example, a history of whether a responding user answered or responded to queries, frequency of visitation of the responding user to the target location, a direction of movement of the responding user, etc. In an example, the query-response management server determines that a responding user who frequently responds to queries is more likely to respond to the target location based query, but if the responding user receives multiple alerts for providing responses to queries, the responding user may consider the queries as spam and may disconnect access to the query-response management server. The query-response management server therefore selectively narrows the list of present responding users for routing the target location based query.

The query-response management server pushes 406 the target location based query to the narrowed list of present responding users. The query-response management server then waits 407 for responses from the responding users in the narrowed list for a predefined waiting period. If the predefined waiting period has not elapsed 408, the query-response management server continues to wait 407 for responses from the responding users in the narrowed list. If the predefined waiting period has elapsed 408, and the query-response management server does not receive 409 any responses from the present responding users, the query-response management server further narrows 405 the list of present responding users based on the responding users' activity history and repeats the steps 406, 407, 408, and 409. If the query-response management server receives 409 responses from the responding users, the query-response management server aggregates 410 the responses and pushes 411 the aggregated responses to the requesting user.

Figure 5:
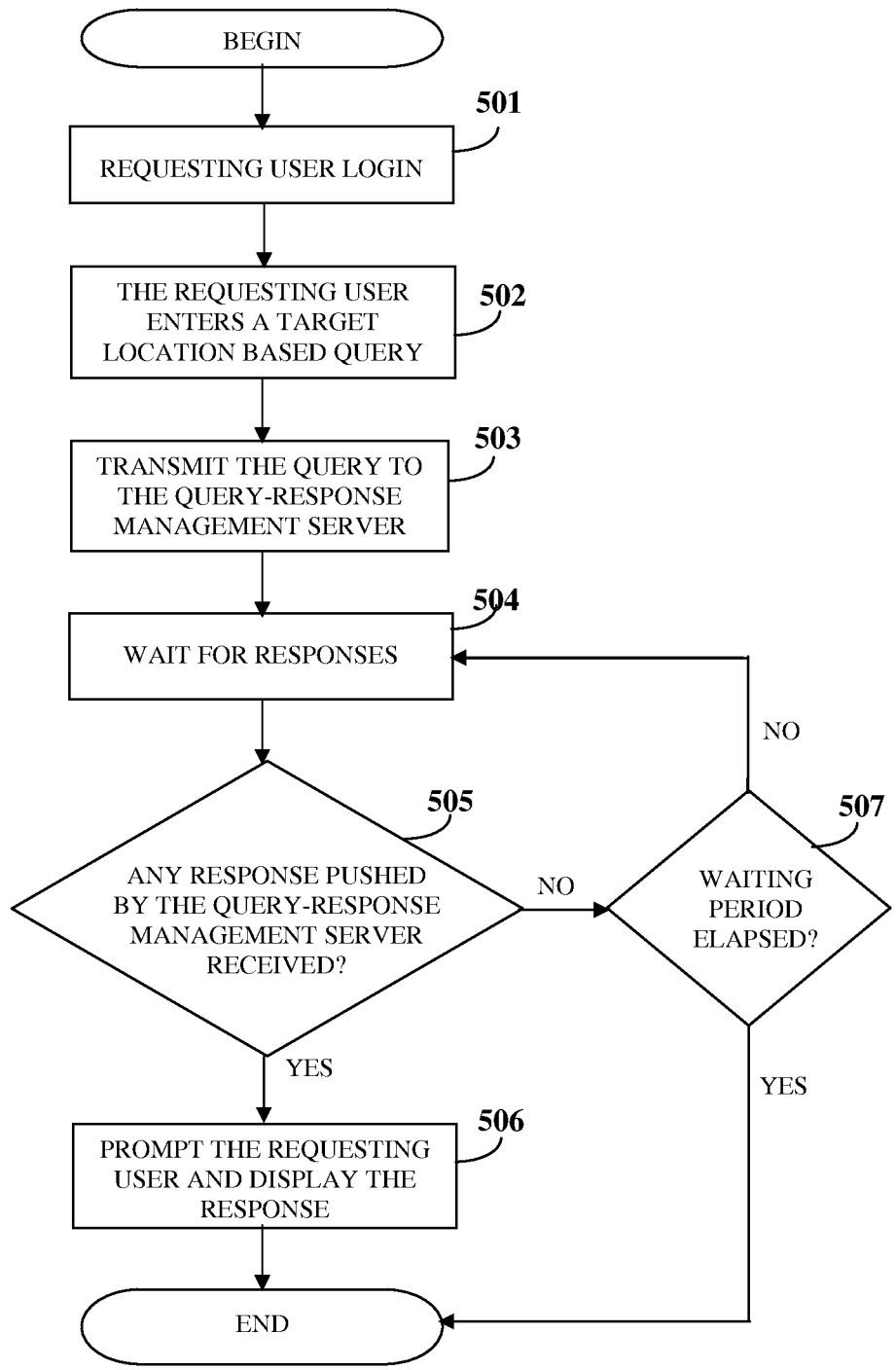
FIG. 5 exemplarily illustrates a flowchart comprising the steps performed by a first client application on a requesting device for transmitting a query associated with a target location and rendering responses to a requesting user.

FIG. 5 exemplarily illustrates a flowchart comprising the steps performed by the first client application on a requesting device for transmitting a query associated with a target location and rendering responses to a requesting user. A requesting user logs in 501 to the first client application on the requesting device and enters 502 a target location based query via the graphical user interface (GUI) of the first client application. The first client application transmits 503 the query to the query-response management server via the network and waits 504 for responses from responding users selected by the query-response management server based on their proximity to the target location and their activity information. The first client application waits for a predefined waiting period. During the predefined waiting period, the first client application determines whether any response pushed by the query-response management server is received 505. If the first client application receives any response from the query-response management server, the first client application prompts 506 the requesting user and displays 506 the response on the GUI. If the first client application does not receive any response from the query-response management server and the waiting period elapses 507, the first client application terminates the process. If the first client application does not receive any response from the query-response management server and the waiting period has not elapsed 507, the first client application continues to wait 504 for responses pushed by the query-response management server.

Figure 6:
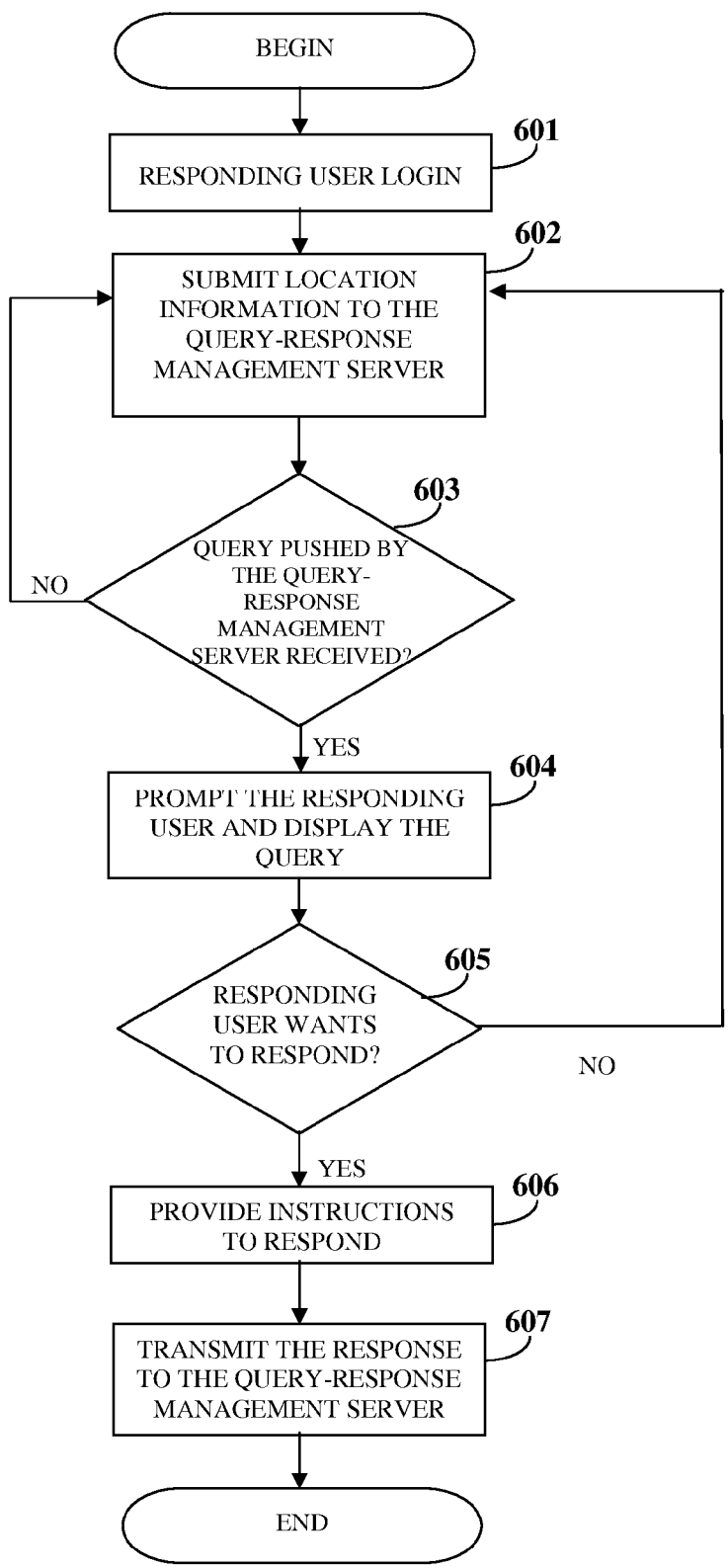
FIG. 6 exemplarily illustrates a flowchart comprising the steps performed by a second client application on a location enabled responding device for instructing a responding user to respond to a query associated with a target location asked by a requesting user.

FIG. 6 exemplarily illustrates a flowchart comprising the steps performed by the second client application on a location enabled responding device for instructing a responding user to respond to a query associated with a target location asked by a requesting user. The responding user logs in 601 to the second client application on the responding device via a graphical user interface (GUI) of the second client application. The responding user submits 602 location information, for example, geographical coordinates of the responding device, an internet protocol address of the responding device, etc., to the query-response management server via the network. The second client application determines whether a target location based query pushed by the query-response management server has been received 603. If the second client application does not receive the target location based query, the second client application continues to submit 602 location information to the query-response management server. If the second client application receives the target location based query, the second client application prompts 604 the responding user about the query and displays 604 the query on the GUI to the responding user. If the responding user does not want 605 to respond to the query, the second client application continues to submit 602 location information to the query-response management server and repeats the steps 603 and 604. If the responding user wants 605 to respond to the query, the second client application provides 606 instructions to the responding user to respond. For example, the second client application walks the responding user through the process of collecting response data, for example, in the form of textual content, image content, voice content, video content, etc., for preparing the response. The second client application then transmits 607 the prepared response to the query-response management server via the network and completes the process for a particular query.

Figure 7:
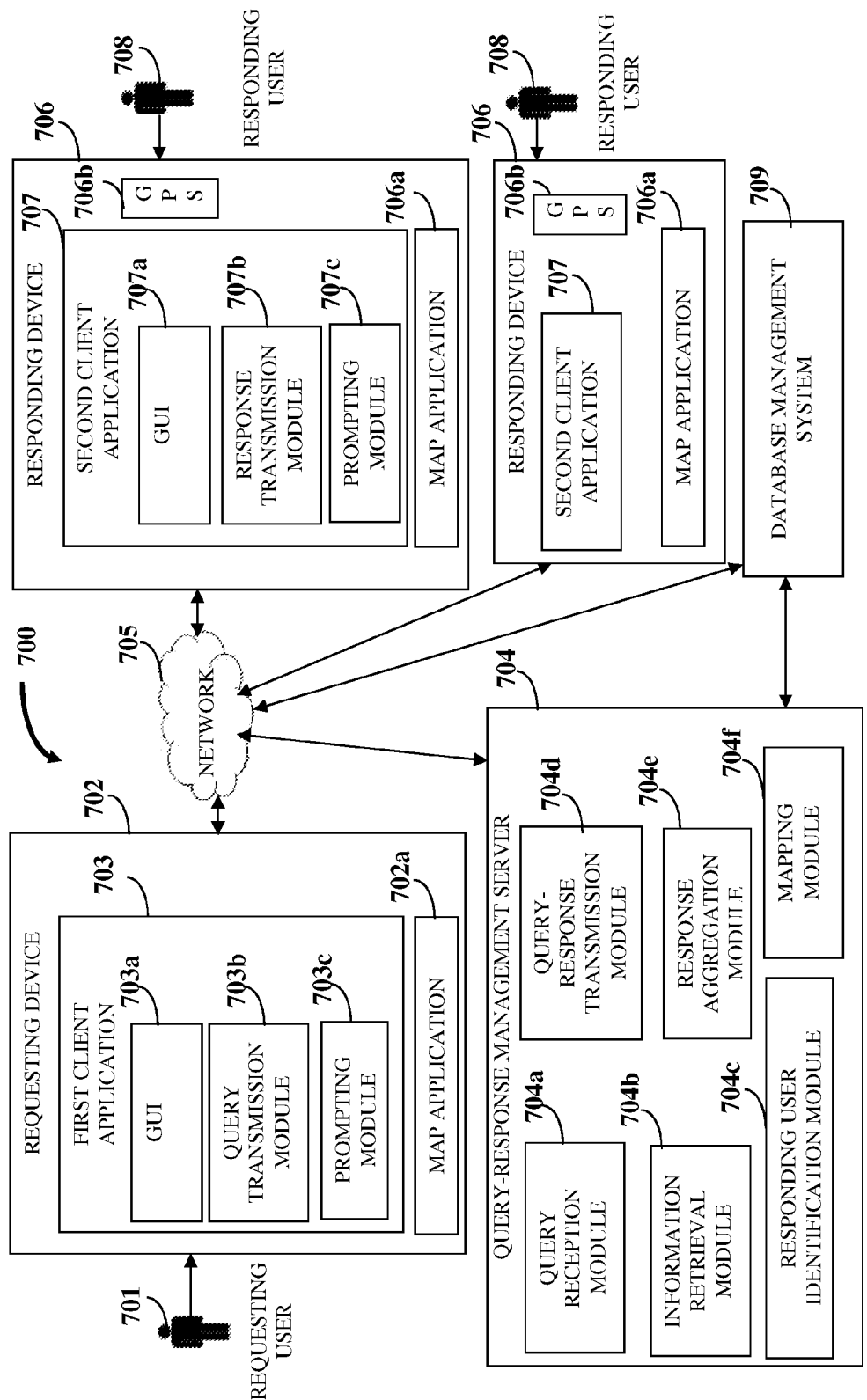
FIG. 7 illustrates a computer implemented system for rendering time sensitive responses to a query associated with a target location.

FIG. 7 illustrates a computer implemented system 700 for rendering time sensitive responses to a query associated with a target location. The computer implemented system 700 disclosed herein comprises a first client application 703 on a requesting device 702 of a requesting user 701, a second client application 707 on a responding device 706 of a responding user 708, a query-response management server 704, and a database management system 709 communicating with each other via a network 705. The network 705 is, for example, the internet, an intranet, an extranet, a wide area network (WAN), a local area network (LAN), a wired network, a wireless network, or any other network, etc., or any combination of two or more networks. The requesting device 702 of the requesting user 701 deploys the first client application 703. The requesting device 702 is a portable or a non-portable computing device, for example, a computer, a server, a laptop, tablet, a personal digital assistant, a mobile phone, or any other device that can be connected to the network 705. The first client application 703 may reside on a non-portable computing device, while the second client application 707 must reside on a portable computing device. The first client application 703 and the second client application 707 can reside on the same portable computing device.

The first client application 703 deployed on the requesting device 702 is, for example, a web application or a mobile application that allows the requesting user 701 to input target location based queries. The first client application 703 comprises a graphical user interface 703a, a query transmission module 703b, and a prompting module 703c. The first client application 703 is executable by at least one processor configured to execute the modules 703b and 703c of the first client application 703. The requesting user 701 enters a target location based query in a predefined media format, for example, for example, "I want to know <WHAT> <WHERE> and the answer is relevant until <WHEN>", into the first client application 703 via the GUI 703a. The requesting user 701 may enter a target location based query in one or more media formats, a text media format, an image media format, a video media format, an audio media format, a voice media format, a non-voice audio media format, a digital media format, a multimedia format, etc., via the GUI 703a.

In an embodiment, the computer implemented system 700 further comprises a map application 702a executable by at least one processor deployed on the requesting device 702 for facilitating selection of the target location for the query. During preparation of the query, the requesting user 701 may invoke the map application 702a on the requesting device 702 for selecting the target location. In an embodiment, the map application 702a maps the target location, for example, an address of the department of motor vehicles (DMV), an address of an airport, the address of Disneyland, etc., to geographical coordinates. In another embodiment, a mapping module 704f of the query-response management server 704 resolves the target location to geographical coordinates after receiving the target location based query from the first client application 703 on the requesting device 702 of the requesting user 701 via the network 705. Furthermore, the map application 702a on the requesting device 702 validates the target location to determine whether the target location is a valid point of interest on a geographical map. The query transmission module 703b of the first client application 703 transmits the target location based query in the predefined media format to the query-response management server 704 via the network 705.

The query-response management server 704 communicates with the first client application 703 on the requesting device 702 and the second client application 707 on the responding device 706 via the network 705. The query-response management server 704 comprises a query reception module 704a, an information retrieval module 704b, a responding user identification module 704c, a query-response transmission module 704d, a response aggregation module 704e, and a mapping module 704f. The query-response management server 704 comprises at least one processor configured to execute the modules 704a, 704b, 704c, 704d, 704e, and 704f of the query-response management server 704 for managing and rendering time sensitive responses to queries associated with target locations. The query reception module 704a receives the query comprising information on the target location from the first client application 703 on the requesting device 702 of the requesting user 701 via the network 705.

The mapping module 704f of the query-response management server 704 extracts the target location from the query and maps the target location extracted from the received query to geographical coordinates of the target location for enabling the responding user identification module 704c to identify one or more of the responding users 708 proximal to the target location. In an embodiment, if the mapping module 704f cannot uniquely resolve the geographical coordinates of the target location, the mapping module 704f transmits a clarification request about the target location to the first client application 703 on the requesting device 702 of the requesting user 701 via the network 705. For example, if the target location defined in the query is "San Diego DMV" and if the mapping module 704f determines that there are three DMV locations in San Diego, the mapping module 704f transmits a clarification request to the first client application 703 on the requesting device 702 of the requesting user 701 via the network 705, for a finer resolution on the DMV location to which the requesting user 701 refers.

The information retrieval module 704b of the query-response management server 704 dynamically retrieves location information and activity information of each of the responding users 708 via the network 705. For example, the information retrieval module 704b dynamically retrieves location information, for example, geographical coordinates of the responding users' 708 responding devices 706 from the global positioning systems 706b in the respective responding devices 706, internet protocol addresses of the responding users' 708 responding devices 706, etc. The database management system 709 stores and maintains records of the location information and the activity information of the responding users 708. The database management system 709 communicates with the query-response management server 704 directly via a wired interface or via the network 705. The information retrieval module 704b dynamically monitors a location of the responding device 706 of each of the responding users 708 via the network 705 for enabling the responding user identification module 704c to identify one or more of the responding users 708 proximal to the target location. The responding user identification module 704c identifies one or more of the responding users 708 proximal to the target location extracted from the received query, based on the dynamically retrieved location information and activity information. The responding user identification module 704c selects one or more of the identified responding users 708 for routing the received query based on the dynamically retrieved activity information of each of the identified responding users 708. The query-response transmission module 704d of the query-response management server 704 transmits the received query to the second client application 707 on the responding device 706 of each of the identified responding users 708 via the network 705.

The responding device 706 is, for example, a laptop, a tablet, a personal digital assistant, a mobile phone, or any other device that is portable such that the responding user 708 may carry the responding device 706 from place to place. The responding device 706 may be a location enabled computing device, for example, with a global positioning system (GPS) 706b or an internet enabled computing device having an internal protocol (IP) address. The location enabled responding device 706 comprises a positioning system, for example, a global positioning system (GPS) 706b configured to generate a position of the responding device 706. The GPS 706b determines the position of the responding device 706 based on satellite signals. In an embodiment, the GPS 706b determines a location of the responding device 706 based on signals received, for example, from cellular towers, or other signals. The GPS 706b transmits the position or the location of the responding device 706 to the query-response management server 704 at periodic intervals. The responding device 706 of the responding user 708 deploys the second client application 707.

The second client application 707 deployed on the responding device 706 is, for example, a web application or a mobile application that prompts the responding user 708 about received queries, allows the responding user 708 to respond to the queries, and guides the responding user 708 through a data collection process to respond to the queries. The second client application 707 comprises a graphical user interface 707a, a response transmission module 707b, and a prompting module 707c. The second client application 707 is executable by at least one processor configured to execute the modules 707b and 707c of the second client application 707. The prompting module 707c of the second client application 707 prompts each of the responding users 708 via the GUI 707a of the second client application 707, on reception of the transmitted query by each of the responding users 708. In an embodiment, the computer implemented system 700 further comprises a map application 706a executable by at least one processor deployed on the responding device 706 of each of the responding users 708 for indicating a distance and directions to the target location defined in the transmitted query. The response transmission module 707b of the second client application 707 transmits the responses to the transmitted query to the query-response management server 704 via the network 705 in one or more of multiple media formats.

The response aggregation module 704e of the query-response management server 704 awaits reception of the responses to the transmitted query from the second client application 707 on the responding device 706 of each of the selected responding users 708 via the network 705 for a predefined period of time. The responding user identification module 704c selects another one or more of the identified responding users 708 for routing the received query based on the dynamically retrieved activity information of each of the other selected responding users 708, on non-reception of the responses from the selected responding users 708 within the predefined period of time. On receiving responses from the selected responding users 708, the response aggregation module 704e receives and aggregates responses to the transmitted query from the second client application 707 on the responding device 706 of each of the selected responding users 708 via the network 705. The query-response transmission module 704d of the query-response management server 704 renders the aggregated responses to the first client application 703 on the requesting device 702 of the requesting user 701 via the network 705. The prompting module 703c of the first client application 703 prompts the requesting user 701 via the GUI 703a of the first client application 703, on reception of the aggregated responses by the requesting device 702 of the requesting user 701 from the query-response management server 704 via the network 705.

In an embodiment, the second client application 707, in communication with the GPS 706b, beacons the location of the responding device 706 to a location server (not shown) that communicates with the query-response management server 704 directly via a wired interface or via the network 705. The location server is a backend system that receives beacon events from the field, that is, from the responding devices 706 and maintains an up-to-date list of the responding users 708 and their current locations. In an embodiment, the responding user identification module 704c is hosted externally on a routing system (not shown) that communicates with the location server and the query-response management server 704 directly via a wired interface or via the network 705. The routing system queries the location server for a list of responding users 708 that were recently in the vicinity of the target location specified in the requesting user's 701 query and sends requests for an exact current location to a list of selected responding users 708. Based on the responses to these requests and other factors about the responding users 708 and their responding devices 706, the routing system identifies one or more of the responding users 708 to whom the target location based query will be routed. The query-response transmission module 704d of the query-response management server 704, in communication with the routing system, then routes the target location based query to the identified responding users 708.

Consider an example where a requesting user 701 named Tim wants to know how long the lines are at Disneyland today. Tim registers with the query-response management server 704 and downloads the first client application 703 on his smart phone. Multiple responding users 708 including Jane, James, Jill, Richard, Warren, and Carla also register with the query-response management server 704 and download the second client application 707 on each of their location enabled mobile phones. The requesting user 701 Tim invokes the first client application 703 on his smart phone and enters a location based query in a format as "I want to know how long the lines are at Disneyland today and the answer is relevant until 11 a.m. today", where the target location is Disneyland, into the first client application 703 via the GUI 703a of the first client application 703. The map application 702a on Tim's smart phone facilitates selection of a geographical location for the target location Disneyland as Anaheim, Calif. The first client application 703 transmits Tim's location based query to the query-response management server 704 via the network 705.

The query-response management server 704 receives Tim's location based query via the network 705. The mapping module 704f of the query-response management server 704 extracts the target location Disneyland or Anaheim, Calif. from the location based query and determines the geographical coordinates of Disneyland, for example, as 33.8122° N, 117.9200° W. The information retrieval module 704b dynamically monitors the locations of the responding devices 706 of the registered responding users 708. The responding user identification module 704c, in communication with the information retrieval module 704b, identifies one or more responding users 708 proximal to Disneyland based on the dynamically retrieved location information and activity information of the responding users 708. The GPS 706b on each of the responding users' 708 location enabled mobile phones transmits their respective location information to the query-response management server 704 via the network 705. Consider an example where the responding users 708 Jane, James, and Richard are currently at Disneyland and that Jane and James are frequent visitors of Disneyland and have been known to respond to most queries transmitted to them by the query-response management server 704. On receiving the location information, the query-response management server 704 creates a list of responding users 708 namely Jane, James, and Richard who are currently at Disneyland. Since the query-response management server 704 determines that Jane and James are frequent visitors of Disneyland and have been known to respond to most queries transmitted to them from their respective activity information, the query-response management server 704 selects Jane and James and pushes the location based query to the second client application 707 on Jane's and James' respective location enabled mobile phones via the network 705. The second client application 707 on Jane's and James' respective location enabled mobile phones prompts them about the location based query.

The query-response management server 704 awaits reception of responses to the location based query from Jane and James for 15 minutes. If Jane and James do not respond within the 15 minutes, the query-response management server 704 selects other registered responding users 708 to push the location based query. On dynamically monitoring the locations of the responding devices 706 of the registered responding users 708, the query-response management server 704 determines that Jill, Warren, and Carla are now entering Disneyland. Based on their activity information, the query-response management server 704 determines that Warren and Carla have been known to answer most queries and pushes the location based query to the second client application 707 on Warren's and Carla's respective location enabled mobile phones. The query-response management server 704 awaits reception of responses to the location based query from Warren and Carla for 15 minutes.

The second client application 707 on Warren's and Carla's respective location enabled mobile phones prompts them about the location based query. Warren enter his response to the location based query displayed on his GUI 707a as a text message, while Carla enters her responses by providing a voice description and by sending an image of the lines at various rides at Disneyland. The second client application 707 on Warren's location enabled mobile phone transmits his text response to the query-response management server 704 via the network 705, while the second client application 707 on Carla's location enabled mobile phone transmits the voice response and the image response to the query-response management server 704 via the network 705. The query-response management server 704 aggregates the responses received from Warren and Carla and transmits the aggregated responses to the first client application 703 on Tim's smart phone via the network 705. The first client application 703 prompts Tim and displays Warren's text response and Carla's image response on the GUI 703a and plays back Carla's voice response. Tim can then determine whether he wants to go to Disneyland today or not.

Figure 8:
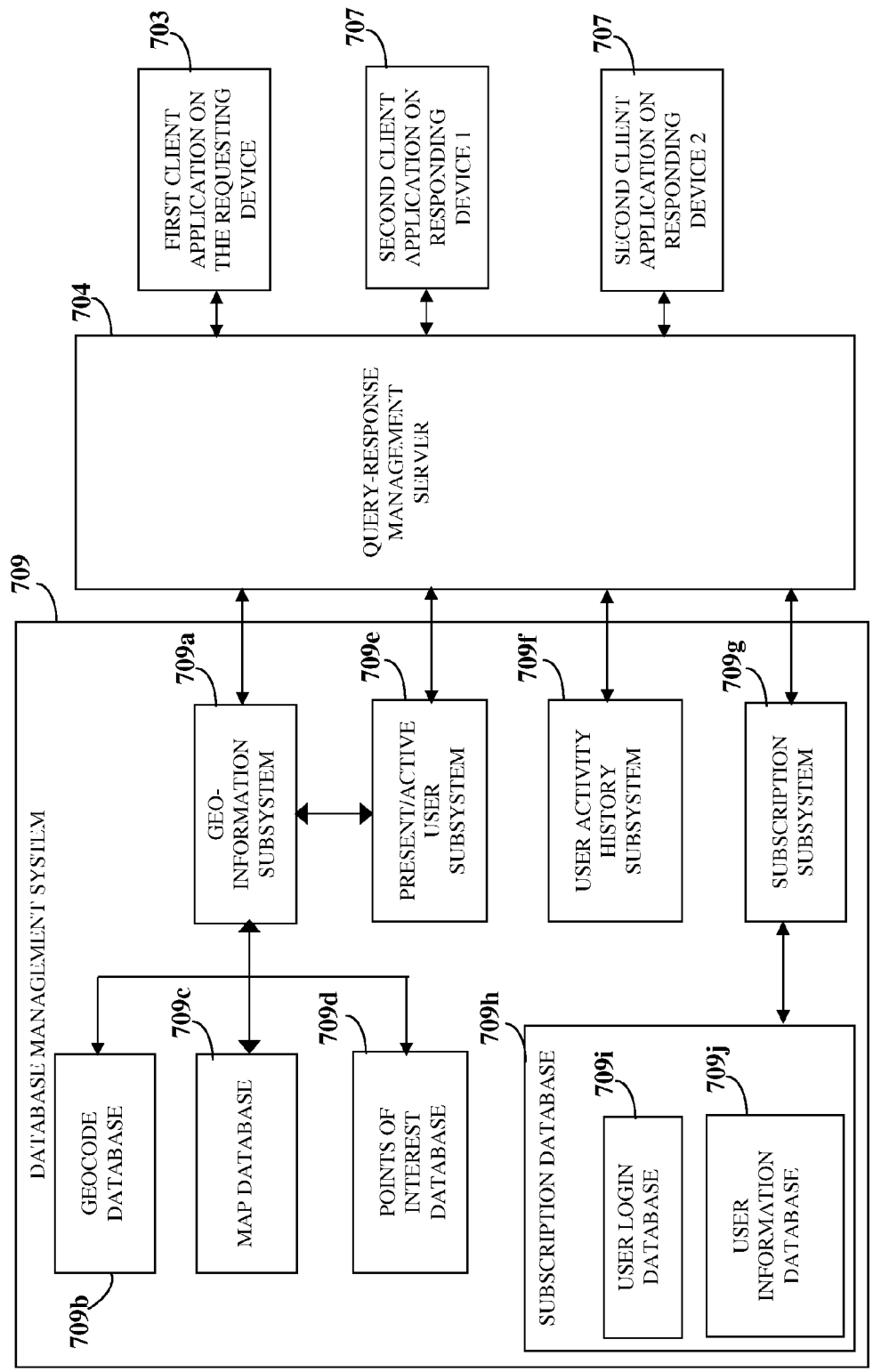
FIG. 8 exemplarily illustrates the query-response management server communicating with a database management system for rendering time sensitive responses to a query associated with a target location.

FIG. 8 exemplarily illustrates the query-response management server 704 communicating with a database management system 709 for rendering time sensitive responses to a query associated with a target location. The database management system 709 comprises a subscription subsystem 709g that interacts with a subscription database 709h, a geo-information subsystem 709a that interacts with a geocode database 709b, a map database 709c, and a points of interest database 709d, a present/active user subsystem 709e that interacts with the geo-information subsystem 709a, and a user activity history subsystem 709f. Any user 701 or 708, exemplarily illustrated in FIG. 7, may use the first client application 703 or the second client application 707 to interact with the query-response management server 704 via the network 705. The query-response management server 704 authenticates the first client application 703 and the second client application 707 through the subscription subsystem 709g.

The subscription subsystem 709g controls and maintains the subscription database 709h that stores information of the requesting user 701 and the responding users 708. The subscription database 709h comprises a user login database 709i that stores user identifiers and associated passwords for authenticating a requesting device 702 and each of the responding devices 706 and for authorizing access by the requesting device 702 and the responding devices 706 to the query-response management server 704. The subscription database 709h further comprises a user information database 709j that stores user profiles and user preferences that contain information about particular usage patterns of the requesting users 701 and the responding users 708. The user information database 709j further stores information provided by the requesting user 701 and the responding user 708 and applied by the query-response management server 704 to customize aspects of a query-response management service provided to a particular user 701 or 708 based on the user preferences.

As the responding device 706 of a responding user 708 deployed with the second client application 707 moves from location to location, the query-response management server 704 receives updates about significant changes in the responding user's 708 position from the present/active user subsystem 709e. The present/active user subsystem 709e tracks each active responding user 708. As a responding user 708 moves, the responding user's 708 responding device 706 with the second client application 707 also moves and transmits location information to the present/active user subsystem 709e, thereby dynamically updating the present/active user subsystem 709e with the current position of the responding user's 708 responding device 706. The second client application 707 also transmits activity information to the user activity history subsystem 709f, thereby updating the user activity history subsystem 709f with the history of the responding user's 708 location changes. In addition to the history of the responding user's 708 location, the user activity history subsystem 709f also stores the responding user's 708 responding or answering history, history of alerts, history of responses, etc.

When the query-response management server 704 receives a query regarding a specific geographical location or a target location, the query-response management server 704 identifies a subset of active responding users 708 that are near the specified target location. The query-response management server 704 narrows the subset of active responding users 708 using the user activity history subsystem 709f. The geo-information subsystem 709a performs geospatially-related processing in communication with the mapping module 704f of the query-response management server 704 and/or the location server (not shown) that communicates with the query-response management server 704 for enabling identification of one or more responding users 708 proximal to the target location specified in the query. The geo-information subsystem 709a relies upon multiple geospatial databases that are provided by third-party vendors. The geocode database 709b stores information about geospatially related systems, for example, information about different types of geospatial representations and the manner in which these geospatial representations are used in the global positioning systems 706b of the responding devices 706, or other positioning systems. The map database 709c stores electronic mapping information, for example, aeronautical maps, nautical maps, geophysical terrain maps, etc., from different sources for different purposes. The points of interest (POI) database 709d stores indexed lists of significant points of interest, the identity and location of multiple different entities, for example, schools, churches, post offices, government buildings, marinas, parks, hospitals, or other related entities. The POI database 709d and the map database 709c store overlapping information, for example, information about a particular bridge.

Figure 9:
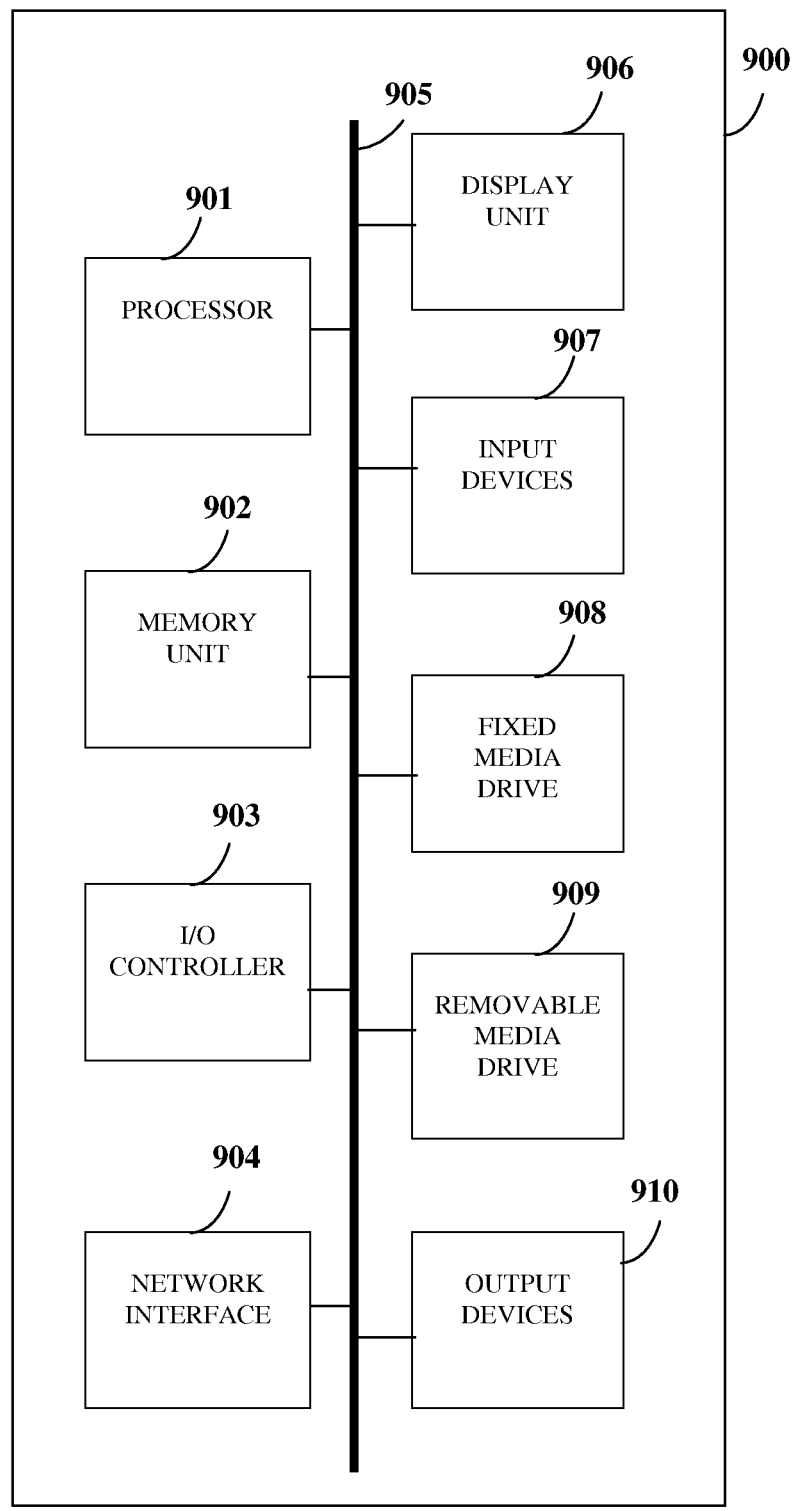
FIG. 9 exemplarily illustrates an architecture of a computer system employed by the query-response management server for rendering time sensitive responses to a query associated with a target location.

FIG. 9 exemplarily illustrates an architecture of a computer system 900 employed by the query-response management server 704 for rendering time sensitive responses to a query associated with a target location. Each of the requesting device 702, the responding device 706, and the query-response management server 704, exemplarily illustrated in FIG. 7, employs the architecture of the computer system 900 exemplarily illustrated in FIG. 9. The computer system 900 comprises, for example, a processor 901, a memory unit 902 for storing programs and data, an input/output (I/O) controller 903, a network interface 904, a data bus 905, a display unit 906, input devices 907, a fixed media drive 908, a removable media drive 909 for receiving removable media, output devices 910, etc.

The processor 901 is an electronic circuit that executes computer programs. The memory unit 902 stores programs, applications, and data. For example, the modules 703b and 703c of the first client application 703 are stored in the memory unit 902 of the computer system 900 of the requesting device 702. The modules 707b and 707c of the second client application 707 are stored in the memory unit 902 of the computer system 900 of the responding device 706. The query reception module 704a, the information retrieval module 704b, the responding user identification module 704c, the query-response transmission module 704d, the response aggregation module 704e, and the mapping module 704f are stored in the memory unit 902 of the computer system 900 of the query-response management server 704. The memory unit 902 is, for example, a random access memory (RAM) or another type of dynamic storage device that stores information and instructions for execution by the processor 901. The memory unit 902 also stores temporary variables and other intermediate information used during execution of the instructions by the processor 901. The computer system 900 further comprises a read only memory (ROM) or another type of static storage device that stores static information and instructions for the processor 901.

The network interface 904 enables connection of the computer system 900 to the network 705. The network 705 is, for example, a local area network (LAN), a wide area network, a mobile communication network, etc. The computer system 900 hosting each of the first client application 703, the second client application 707, and the query-response management server 704 connects to the network 705 via their respective network interfaces 904. The network interface 904 comprises, for example, an infrared (IR) interface, a radio frequency (RF) interface, an interface that implements Wi-Fi® of the Wireless Ethernet Compatibility Alliance, Inc., a universal serial bus interface (USB), a local area network (LAN) interface, a wide area network (WAN) interface, etc. The I/O controller 903 controls input actions and output actions performed, for example, by the requesting users 701 using the first client application 703 and the responding users 708 using the second client application 707. The data bus 905 of the requesting device 702 permits communication between the modules, for example, 703b and 703c, and between the first client application 703 and the map application 702a. The data bus 905 of the responding device 706 permits communication between the modules, for example, 707b and 707c, and between the second client application 707 and the map application 706a. The data bus 905 of the query-response management server 704 permits communication between the modules, for example, 704a, 704b, 704c, 704d, 704e, and 704f of the query-response management server 704 and between the query-response management server 704 and the database management system 709.

The display unit 906 of the requesting device 702 displays, via the GUI 703a of the first client application 703, the rendered responses to the requesting user 701. The display unit 906 of the responding device 706 displays, via the GUI 707a of the second client application 707, the transmitted location based query to the responding user 708. The input devices 907 are used for inputting data into the computer system 900. The input devices 907 are, for example, a keyboard such as an alphanumeric keyboard, a joystick, a pointing device such as a computer mouse, a touch pad, a light pen, etc. The output devices 910 output the results of operations computed by the first client application 703 to the requesting user 701. The output devices 910 output the results of the operations computed by the second client application 707 to the responding user 708.

Computer applications and programs are used for operating the computer system 900. The programs are loaded onto the fixed media drive 908 and into the memory unit 902 of the computer system 900 via the removable media drive 909. In an embodiment, the computer applications and programs may be loaded directly via the network 705. Computer applications and programs are executed by double clicking a related icon displayed on the display unit 906 using one of the input devices 907.

The computer system 900 of each of the requesting device 702, the responding device 706, and the query-response management server 704 employs an operating system for performing multiple tasks. The operating system is responsible for managing and coordinating activities and for sharing resources of the computer system 900. The operating system further manages security of the computer system 900, peripheral devices connected to the computer system 900, and network connections. The operating system recognizes, for example, inputs provided by the requesting user 701 or a responding user 708 using the requesting device 702 or the responding device 706 respectively, an output display, files, and directories stored locally on the fixed media drive 908. The operating system on the computer system 900 of the requesting device 702 executes different programs, for example, a web browser, an electronic mail (email) application, etc., initiated by the requesting user 701 through the requesting device 702, using the processor 901. The operating system on the computer system 900 of the responding device 706 executes different programs, for example, a web browser, an electronic mail (email) application, etc., initiated by the responding user 708 through the responding device 702, using the processor 901. The operating system monitors the use of the processor 901. The processor 901 retrieves instructions for executing the modules, for example, 704a, 704b, 704c, 704d, 704e, and 704f of the query-response management server 704, the modules 703b and 703c of the first client application 703, and the modules 707b and 707c of the second client application 707 from the memory unit 902 in the form of signals. A program counter determines a location of each of the instructions in the memory unit 902. The program counter stores a number that identifies the current position in the program of the modules, for example, 704a, 704b, 704c, 704d, 704e, and 704f of the query-response management server 704, the modules 703b and 703c of the first client application 703, and the modules 707b and 707c of the second client application 707.

The instructions fetched by the processor 901 from the memory unit 902 after being processed are decoded. The instructions are placed in an instruction register (IR) in the processor 901. After processing and decoding, the processor 901 executes the instructions. For example, the query transmission module 703b of the first client application 703 defines instructions for transmitting a location based query in a predefined media format to the query-response management server 704 via the network 705. The map application 702a on the requesting device 702 defines instructions for facilitating selection of the target location for the query. The query reception module 704a of the query-response management server 704 defines instructions for receiving the location based query from the first client application 703 on the requesting device 702 of the requesting user 701 via the network 705. The mapping module 704f defines instructions for mapping the target location extracted from the received query to geographical coordinates of the target location for enabling identification of one or more of the responding users 708 proximal to the target location.

The information retrieval module 704b defines instructions for dynamically retrieving location information and activity information of each of the responding users 708 via the network 705. The information retrieval module 704b defines instructions for dynamically monitoring a location of the responding device 706 of each of the responding users 708 via the network 705 for enabling the identification of the responding users 708 proximal to the target location. The responding user identification module 704c defines instructions for identifying one or more of the responding users 708 proximal to the target location extracted from the received query, based on the dynamically retrieved location information and activity information. The responding user identification module 704c defines instructions for selecting one or more of the identified responding users 708 for routing the received query based on the dynamically retrieved activity information of each of the identified responding users 708. The query-response transmission module 704d defines instructions for transmitting the received query to the second client application 707 on the responding device 706 of each of the selected responding users 708 via the network 705.

The response aggregation module 704e defines instructions for awaiting reception of responses to the transmitted query from the second client application 707 on the responding device 706 of each of the selected responding users 708 via the network 705 for a predefined period of time. The responding user identification module 704c defines instructions for selecting another one or more of the identified responding users 708 for routing the received query based on the dynamically retrieved activity information of each of the other selected responding users 708, on non-reception of the responses from the selected responding users 708 within the predefined period of time. The prompting module 707c of the second client application 707 defines instructions for prompting each of the responding users 708 via the GUI 707a of the second client application 707, on reception of the transmitted query by the responding device 706 of each of the responding users 708. The map application 706a on the responding device 706 of each of the responding users 708 defines instructions for indicating a distance and directions to the target location defined in the transmitted query. The response transmission module 707b of the second client application 707 defines instructions for transmitting the responses to the transmitted query to the query-response management server 704 via the network 705 in one or more of multiple media formats.

The response aggregation module 704e of the query-response management server 704 defines instructions for receiving and aggregating responses to the transmitted query from the second client application 707 on the responding device 706 of each of one or more of the selected responding users 708 via the network 705. The query-response transmission module 704d defines instructions for rendering the aggregated responses to the first client application 703 on the requesting device 702 of the requesting user 701 via the network 705. The prompting module 703c of the first client application 703 defines instructions for prompting the requesting user 701 via the GUI 703a of the first client application 703, on reception of the aggregated responses by the requesting device 702 of the requesting user 701 from the query-response management server 704 via the network 705.

The processor 901 of the query-response management server 704 retrieves the instructions defined by the query reception module 704a, the information retrieval module 704b, the responding user identification module 704c, the query-response transmission module 704d, the response aggregation module 704e, and the mapping module 704f and executes the instructions. The processor 901 of the requesting device 702 retrieves the instructions defined by the query transmission module 703b and the prompting module 703c of the first client application 703, and the map application 702a, and executes the instructions. The processor 901 of the responding device 706 retrieves the instructions defined by the response transmission module 707b and the prompting module 707c of the second client application 707, and the map application 706a, and executes the instructions.

At the time of execution, the instructions stored in the instruction register are examined to determine the operations to be performed. The operations comprise arithmetic operations and logic operations. The processor 901 then performs the specified operations. The operating system performs multiple routines for performing a number of tasks required to assign the input devices 907, the output devices 910, and memory for execution of the modules, for example, 704a, 704b, 704c, 704d, 704e, and 704f of the query-response management server 704, the modules 703b and 703c of the first client application 703, and the modules 707b and 707c of the second client application 707. The tasks performed by the operating system comprise assigning memory to the modules, for example, 704a, 704b, 704c, 704d, 704e, and 704f of the query-response management server 704, the modules 703b and 703c of the first client application 703, and the modules 707b and 707c of the second client application 707, moving data between the memory unit 902 and disk units, and handling input operations and output operations. The operating system performs the tasks on request by the operations and after performing the tasks, the operating system transfers the execution control back to the processor 901. The processor 901 continues the execution to obtain one or more outputs. The outputs of the execution of the modules, for example, 704a, 704b, 704c, 704d, 704e, and 704f of the query-response management server 704, the modules 703b and 703c of the first client application 703, and the modules 707b and 707c of the second client application 707 are displayed, for example, to operators of the query-response management server 704, the requesting user 701 of the requesting device 702, and the responding user 708 of the responding device 706 respectively.

For purposes of illustration, the detailed description refers to each of the requesting device 702, the responding device 706, and the query-response management server 704 being run locally on a computer system 900; however the scope of the computer implemented method and system 700 disclosed herein is not limited to each of the requesting device 702, the responding device 706, and the query-response management server 704 being run locally on the computer system 900 via the operating system and the processor 901, but may be extended to run remotely over the network 705 by employing a web browser and a remote server, a mobile phone, or other electronic devices.

Disclosed herein is also a computer program product comprising a non-transitory computer readable storage medium that stores computer program codes comprising instructions executable by at least one processor 901. As used herein, the term "non-transitory computer readable storage medium" refers to all computer readable media, for example, non-volatile media such as optical disks or magnetic disks, volatile media such as a register memory, a processor cache, etc., and transmission media such as wires that constitute a system bus coupled to the processor 901, except for a transitory, propagating signal.

The computer program product disclosed herein comprises one or more computer program codes for rendering time sensitive responses to a query associated with a target location. For example, the computer program product disclosed herein comprises a first computer program code for receiving a query comprising information on a target location from the first client application 703 on the requesting device 702 of the requesting user 701 via the network 705; a second computer program code for dynamically retrieving location information and activity information of each of the responding users 708 via the network 705; a third computer program code for identifying one or more of the responding users 708 proximal to the target location extracted from the received query based on the dynamically retrieved location information and activity information; a fourth computer program code for transmitting the received query to the second client application 707 on the responding device 706 of each of the identified responding users 708 via the network 705; a fifth computer program code for receiving and aggregating responses to the transmitted query from the second client application 707 on the responding device 706 of each of one or more of the identified responding users 708 via the network 705; and a sixth computer program code for rendering the aggregated responses to the first client application 703 on the requesting device 702 of the requesting user 701 via the network 705.

The computer program product disclosed herein further comprises a seventh computer program code for selecting one or more of the identified responding users 708 for routing the received query based on the dynamically retrieved activity information of each of the identified responding users 708; an eighth computer program code for awaiting reception of the responses to the transmitted query from the second client application 707 on the responding device 706 of each of the selected responding users 708 via the network 705 for a predefined period of time; and a ninth computer program code for selecting another one or more of the identified responding users 708 for routing the received query based on the dynamically retrieved activity information of each of the other selected responding users 708, on non-reception of the responses from the selected responding users 708 within the predefined period of time. In an embodiment, a single piece of computer program code comprising computer executable instructions performs one or more steps of the managing a query associated with a target location and responses to the query.

The computer program codes comprising the computer executable instructions for rendering time sensitive responses to a query associated with a target location are embodied on the non-transitory computer readable storage medium. The processor 901 of the computer system 900 retrieves these computer executable instructions and executes them. When the processor 901 executes the computer executable instructions, the computer executable instructions cause the processor 901 to perform the method steps for rendering time sensitive responses to a query associated with a target location.

It will be readily apparent that the various methods and algorithms disclosed herein may be implemented on computer readable media appropriately programmed for general purpose computers and computing devices. As used herein, the term "computer readable media" refers to non-transitory computer readable media that participate in providing data, for example, instructions that may be read by a computer, a processor or a like device. Non-transitory computer readable media comprise all computer readable media, for example, non-volatile media, volatile media, and transmission media, except for a transitory, propagating signal. Non-volatile media comprise, for example, optical disks or magnetic disks and other persistent memory volatile media including a dynamic random access memory (DRAM), which typically constitutes a main memory. Volatile media comprise, for example, a register memory, a processor cache, a random access memory (RAM), etc. Transmission media comprise, for example, coaxial cables, copper wire and fiber optics, including wires that constitute a system bus coupled to a processor. Common forms of computer readable media comprise, for example, a floppy disk, a flexible disk, a hard disk, magnetic tape, any other magnetic medium, a compact disc-read only memory (CD-ROM), a digital versatile disc (DVD), any other optical medium, punch cards, paper tape, any other physical medium with patterns of holes, a random access memory (RAM), a programmable read only memory (PROM), an erasable programmable read only memory (EPROM), an electrically erasable programmable read only memory (EEPROM), a flash memory, any other memory chip or cartridge, or any other medium from which a computer can read. A "processor" refers to any one or more microprocessors, central processing unit (CPU) devices, computing devices, microcontrollers, digital signal processors or like devices. Typically, a processor receives instructions from a memory or like device and executes those instructions, thereby performing one or more processes defined by those instructions. Further, programs that implement such methods and algorithms may be stored and transmitted using a variety of media, for example, the computer readable media in a number of manners. In an embodiment, hard-wired circuitry or custom hardware may be used in place of, or in combination with, software instructions for implementation of the processes of various embodiments. Therefore, the embodiments are not limited to any specific combination of hardware and software. In general, the computer program codes comprising computer executable instructions may be implemented in any programming language. Some examples of languages that can be used comprise C, C++, C#, Perl, Python, or JAVA. The computer program codes or software programs may be stored on or in one or more mediums as object code. The computer program product disclosed herein comprises computer executable instructions embodied in a non-transitory computer readable storage medium, wherein the computer program product comprises one or more computer program codes for implementing the processes of various embodiments.

Where databases are described such as the geocode database 709b, the map database 709c, the points of interest database 709d, the subscription database 709h, the user login database 709i, and the user information database 709j, it will be understood by one of ordinary skill in the art that (i) alternative database structures to those described may be readily employed, and (ii) other memory structures besides databases may be readily employed. Any illustrations or descriptions of any sample databases disclosed herein are illustrative arrangements for stored representations of information. Any number of other arrangements may be employed besides those suggested by tables illustrated in the drawings or elsewhere. Similarly, any illustrated entries of the databases represent exemplary information only; one of ordinary skill in the art will understand that the number and content of the entries can be different from those disclosed herein. Further, despite any depiction of the databases as tables, other formats including relational databases, object based models, and/or distributed databases may be used to store and manipulate the data types disclosed herein. Likewise, object methods or behaviors of a database can be used to implement various processes such as those disclosed herein. In addition, the databases may, in a known manner, be stored locally or remotely from a device that accesses data in such a database. In embodiments where there are multiple databases in the system, the databases may be integrated to communicate with each other for enabling simultaneous updates of data linked across the databases, when there are any updates to the data in one of the databases.

The present invention can be configured to work in a network environment including a computer that is in communication with one or more devices via a communication network. The computer may communicate with the devices directly or indirectly, via a wired medium or a wireless medium such as the Internet, a local area network (LAN), a wide area network (WAN) or the Ethernet, token ring, or via any appropriate communications means or combination of communications means. Each of the devices may comprise computers such as those based on the Intel® processors, AMD® processors, UltraSPARC® processors, IBM® processors, etc., that are adapted to communicate with the computer. Any number and type of machines may be in communication with the computer.

The foregoing examples have been provided merely for the purpose of explanation and are in no way to be construed as limiting of the present invention disclosed herein. While the invention has been described with reference to various embodiments, it is understood that the words, which have been used herein, are words of description and illustration, rather than words of limitation. Further, although the invention has been described herein with reference to particular means, materials, and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may affect numerous modifications thereto and changes may be made without departing from the scope and spirit of the invention in its aspects.

We claim:

1. A computer implemented method for rendering time sensitive responses to a query associated with a target location, comprising:
providing a first client application executable by at least one processor on a requesting device of a requesting user, and a second client application executable by at least one processor on a responding device of each of a plurality of responding users;
providing a query-response management server comprising at least one processor configured to render said time sensitive responses to said query associated with said target location, wherein said query-response management server communicates with said first client application on said requesting device and said second client application on said responding device via a network;
receiving said query from said first client application on said requesting device of said requesting user by said query-response management server via said network, wherein said query comprises information on said target location;
dynamically retrieving location information and activity information of each of said responding users by said query-response management server via said network;
identifying one or more of said responding users proximal to said target location extracted from said received query, by said query-response management server based on said dynamically retrieved location information and said activity information;
transmitting said received query to said second client application on said responding device of each of said identified one or more of said responding users by said query-response management server via said network;
receiving and aggregating responses to said transmitted query from said second client application on said responding device of each of one or more of said identified one or more of said responding users by said query-response management server via said network; and
rendering said aggregated responses to said first client application on said requesting device of said requesting user by said query-response management server via said network.

2. The computer implemented method of claim 1, further comprising mapping said target location extracted from said received query to geographical coordinates of said target location by said query-response management server for said identification of said one or more of said responding users proximal to said target location.

3. The computer implemented method of claim 1, wherein said first client application transmits said query in a predefined media format to said query-response management server via said network.

4. The computer implemented method of claim 1, wherein said second client application on said responding device of said each of said one or more of said identified one or more of said responding users transmits said responses to said transmitted query to said query-response management server via said network in one or more of a plurality of media formats.

5. The computer implemented method of claim 1, further comprising dynamically monitoring a location of said responding device of said each of said responding users by said query-response management server via said network for said identification of said one or more of said responding users proximal to said target location.

6. The computer implemented method of claim 1, further comprising selecting one or more of said identified one or more of said responding users for routing said received query by said query-response management server based on said dynamically retrieved activity information of said each of said identified one or more of said responding users.

7. The computer implemented method of claim 6, further comprising awaiting reception of said responses to said transmitted query from said second client application on said responding device of each of said selected one or more of said identified one or more of said responding users by said query-response management server via said network for a predefined period of time.

8. The computer implemented method of claim 7, further comprising selecting another one or more of said identified one or more of said responding users for routing said received query by said query-response management server based on said dynamically retrieved activity information of each of said selected another one or more of said identified one or more of said responding users, on non-reception of said responses from said selected one or more of said identified one or more of said responding users within said predefined period of time.

9. The computer implemented method of claim 1, further comprising prompting said each of said identified one or more of said responding users by said second client application on said responding device of said each of said identified one or more of said responding users via a graphical user interface of said second client application, on reception of said transmitted query by said responding device of said each of said identified one or more of said responding users.

10. The computer implemented method of claim 1, further comprising prompting said requesting user by said first client application on said requesting device of said requesting user via a graphical user interface of said first client application, on reception of said aggregated responses by said requesting device of said requesting user from said query-response management server via said network.

11. A computer implemented system for rendering time sensitive responses to a query associated with a target location, comprising:
  a first client application executable by at least one processor on a requesting device of a requesting user;
  a second client application executable by at least one processor on a responding device of each of a plurality of responding users;
  a query-response management server comprising at least one processor configured to execute modules of said query-response management server for rendering said time sensitive responses to said query associated with said target location, wherein said query-response management server communicates with said first client application on said requesting device and said second client application on said responding device via a network, and wherein said modules of said query-response management server comprise:
    a query reception module that receives said query from said first client application on said requesting device of said requesting user via said network, wherein said query comprises information on said target location;
    an information retrieval module that dynamically retrieves location information and activity information of each of said responding users via said network;
    a responding user identification module that identifies one or more of said responding users proximal to said target location extracted from said received query, based on said dynamically retrieved location information and said activity information;
    a query-response transmission module that transmits said received query to said second client application on said responding device of each of said identified one or more of said responding users via said network;
    a response aggregation module that receives and aggregates responses to said transmitted query from said second client application on said responding device of each of one or more of said identified one or more of said responding users via said network; and
    said query-response transmission module that renders said aggregated responses to said first client application on said requesting device of said requesting user via said network.

12. The computer implemented system of claim 11, wherein said modules of said query-response management server further comprise a mapping module that maps said target location extracted from said received query to geographical coordinates of said target location for enabling said responding user identification module to identify said one or more of said responding users proximal to said target location.

13. The computer implemented system of claim 11, wherein said first client application comprises a query transmission module that transmits said query in a predefined media format to said query-response management server via said network.

14. The computer implemented system of claim 11, wherein said second client application on said responding device of said each of said responding users comprises a response transmission module that transmits said responses to said transmitted query to said query-response management server via said network in one or more of a plurality of media formats.

15. The computer implemented system of claim 11, wherein said information retrieval module dynamically monitors a location of said responding device of said each of said responding users via said network for enabling said responding user identification module to identify said one or more of said responding users proximal to said target location.

16. The computer implemented system of claim 11, wherein said responding user identification module selects one or more of said identified one or more of said responding users for routing said received query based on said dynamically retrieved activity information of said each of said identified one or more of said responding users.

17. The computer implemented system of claim 16, wherein said response aggregation module awaits reception of said responses to said transmitted query from said second client application on said responding device of each of said selected one or more of said identified one or more of said responding users via said network for a predefined period of time.

18. The computer implemented system of claim 17, wherein said responding user identification module selects another one or more of said identified one or more of said responding users for routing said received query based on said dynamically retrieved activity information of each of said selected another one or more of said identified one or more of said responding users, on non-reception of said responses from said selected one or more of said identified one or more of said responding users within said predefined period of time.

19. The computer implemented system of claim 11, wherein said second client application on said responding device of said each of said responding users comprises a prompting module that prompts said each of said responding users via a graphical user interface of said second client application, on reception of said transmitted query by said responding device of said each of said responding users.

20. The computer implemented system of claim 11, wherein said first client application on said requesting device of said requesting user comprises a prompting module that prompts said requesting user via a graphical user interface of said first client application, on reception of said aggregated responses by said requesting device of said requesting user from said query-response management server via said network.

21. The computer implemented system of claim 11, further comprising a map application executable by at least one processor on said requesting device of said requesting user, wherein said map application facilitates selection of said target location for said query.

22. The computer implemented system of claim 11, further comprising a map application executable by at least one processor on said responding device of said each of said responding users, wherein said map application indicates a distance and directions to said target location defined in said transmitted query.

23. A computer program product comprising a non-transitory computer readable storage medium, said non-transitory computer readable storage medium storing computer program codes that comprise instructions executable by at least one processor, said computer program codes comprising:
  a first computer program code for receiving a query from a first client application provided on a requesting device of a requesting user via a network, wherein said query comprises information on a target location;
  a second computer program code for dynamically retrieving location information and activity information of each of a plurality of responding users via said network;
  a third computer program code for identifying one or more of said responding users proximal to said target location extracted from said received query based on said dynamically retrieved location information and said activity information;
  a fourth computer program code for transmitting said received query to a second client application provided on a responding device of each of said identified one or more of said responding users via said network;
  a fifth computer program code for receiving and aggregating responses to said transmitted query from said second client application on said responding device of each of one or more of said identified one or more of said responding users via said network; and
  a sixth computer program code for rendering said aggregated responses to said first client application on said requesting device of said requesting user via said network.

24. The computer program product of claim 23, wherein said computer program codes further comprise:
  a seventh computer program code for selecting one or more of said identified one or more of said responding users for routing said received query based on said dynamically retrieved activity information of said each of said identified one or more of said responding users;
  an eighth computer program code for awaiting reception of said responses to said transmitted query from said second client application on said responding device of each of said selected one or more of said identified one or more of said responding users via said network for a predefined period of time; and
  a ninth computer program code for selecting another one or more of said identified one or more of said responding users for routing said received query based on said dynamically retrieved activity information of each of said selected another one or more of said identified one or more of said responding users, on non-reception of said responses from said selected one or more of said identified one or more of said responding users within said predefined period of time.

\* \* \* \* \*